(12) United States Patent
Lovelady

(10) Patent No.: US 10,035,499 B2
(45) Date of Patent: Jul. 31, 2018

(54) STABILIZING CHOCK ASSEMBLY FOR CASTER WHEEL AND ASSOCIATED METHOD OF USE

(71) Applicant: Consolidated Nuclear Security, LLC, Reston, VA (US)

(72) Inventor: Michael Wayne Joseph Lovelady, Kingston, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 0 days.

(21) Appl. No.: 15/253,211

(22) Filed: Aug. 31, 2016

(65) Prior Publication Data

US 2018/0056948 A1  Mar. 1, 2018

(51) Int. Cl.
*B60T 3/00* (2006.01)

(52) U.S. Cl.
CPC ...................... *B60T 3/00* (2013.01)

(58) Field of Classification Search
CPC ........ B60B 33/0049; B60P 3/077; B60T 3/00; B60T 1/14; Y10T 16/216
USPC ............................................ 188/1.12, 32, 36
See application file for complete search history.

(56) References Cited

U.S. PATENT DOCUMENTS

| | | | | |
|---|---|---|---|---|
| 3,184,783 A | * | 5/1965 | Brigham | ................. B60B 33/00 16/18 CG |
| 3,719,370 A | * | 3/1973 | Gintick | ................. B62B 5/0423 16/18 CG |
| 4,441,586 A | * | 4/1984 | Bernier | ................... B60R 25/09 188/32 |
| 4,804,070 A | * | 2/1989 | Bohler | .................... B60R 25/09 188/32 |
| 5,170,528 A | * | 12/1992 | Navar | ..................... B60B 33/00 16/18 CG |
| 5,210,903 A | | 5/1993 | Horning | |
| 5,371,920 A | * | 12/1994 | Rainville | ................ B60B 33/00 128/203.12 |
| 5,513,727 A | | 5/1996 | Belanger | |
| 5,829,096 A | | 11/1998 | Perry | |
| 5,873,144 A | * | 2/1999 | Tupper | ...................... B60B 7/02 16/18 CG |
| 6,183,405 B1 | * | 2/2001 | Schurig | ............... B60B 33/0039 16/18 B |

(Continued)

*Primary Examiner* — Thomas W Irvin
(74) *Attorney, Agent, or Firm* — Clements Bernard Walker PLLC; Christopher L. Bernard

(57) ABSTRACT

A stabilizing chock assembly for a caster wheel or the like, including: a first stabilizing member or piece and a second stabilizing member or piece; and a clamping mechanism coupling the first stabilizing member to the second stabilizing member, the clamping mechanism operable for selectively biasing the first stabilizing member and the second stabilizing member together about a wheel; wherein the first stabilizing member and the second stabilizing member collectively define a conformal recess that is configured to selectively receive and retain a lower portion of the wheel. Optionally, the first stabilizing member and the second stabilizing member each define an arcuate ramp structure that forms a portion of the conformal recess. Optionally, the chock assembly also includes a friction surface disposed on a bottom surface of each of the first stabilizing member and the second stabilizing member.

19 Claims, 4 Drawing Sheets

(56) References Cited

U.S. PATENT DOCUMENTS

| | | | | |
|---|---|---|---|---|
| 6,332,240 B1* | 12/2001 | Wu | ............... | B60B 33/001 |
| | | | | 16/18 B |
| 6,625,846 B2* | 9/2003 | Takizawa | ............... | B25J 5/007 |
| | | | | 16/18 B |
| 7,810,769 B2* | 10/2010 | Williams | ............... | A47B 91/00 |
| | | | | 248/188.1 |
| 8,047,751 B2* | 11/2011 | Powers | ............... | B60T 3/00 |
| | | | | 410/10 |
| 8,904,597 B2* | 12/2014 | Long | ............... | B60B 33/0015 |
| | | | | 16/18 CG |
| 9,108,462 B1* | 8/2015 | Stone | ............... | B60B 33/0023 |
| 9,566,926 B1* | 2/2017 | Dubas | ............... | B60R 19/54 |
| 9,669,655 B1* | 6/2017 | Soliman | ............... | B60B 7/10 |
| 2006/0032015 A1 | 2/2006 | Wyman | | |
| 2007/0050999 A1* | 3/2007 | Milner | ............... | B60R 25/09 |
| | | | | 33/286 |
| 2010/0108448 A1* | 5/2010 | Wyers | ............... | B60R 25/093 |
| | | | | 188/32 |

* cited by examiner

STABILIZING CHOCK ASSEMBLY FOR CASTER WHEEL AND ASSOCIATED METHOD OF USE

STATEMENT REGARDING FEDERALLY SPONSORED RESEARCH OR DEVELOPMENT

The U.S. Government has rights to the present invention pursuant to Contract No. DE-NA0001942 between the U.S. Department of Energy and Consolidated Nuclear Security, LLC.

FIELD OF THE INVENTION

The present invention relates generally to the industrial safety equipment field. More specifically, the present invention relates to stabilizing chock assemblies for caster wheels or the like and associated methods of use. These stabilizing chock assemblies are used to prevent the caster wheels or the like from swiveling or gliding on a floor or other surface when a hoist or the like is used in an industrial setting, for example.

BACKGROUND OF THE INVENTION

Caster wheels and the like are notorious for inadvertently swiveling or gliding on the floor or other surface when in use and in a locked (and/or interlocked) configuration. This is problematic when the caster wheels or the like are those of a hoist or the like, potentially supporting a heavy load. If a caster swivels and a hoist shifts, the load can be dropped, potentially injuring a worker and/or damaging property. Thus, the use of failsafe devices is imperative.

To date, most caster locks have consisted of mechanisms that prevent the rotation of a caster wheel about its axle or housings that otherwise arrest the rotation of the caster wheel. For example, U.S. Pat. No. 5,829,096 provides a caster that includes a wheel rotatable about a wheel axis of rotation, a housing, a locking arm linked to the housing, and a locking bar linked to the housing. The housing includes a housing side wall and a housing detent formed in the housing side wall. The locking arm is movable between an unlocked position to permit the wheel to rotate about its wheel axis of rotation and a locked position to prevent or substantially restrict rotation of the wheel about its wheel axis of rotation. The locking arm is linked to the wheel so that movement of the locking arm between the locked and unlocked positions moves the wheel. The locking arm includes a locking arm side wall and a flared portion formed in the locking arm side wall and extending outwardly toward the housing side wall, the flared portion is engaged with the housing detent when the locking arm is in the locked position and disengaged from the housing detent when the locking arm is in the unlocked position. The locking bar includes a brake facing toward the wheel and engaging the wheel when the locking arm is situated in the locked position to prevent or substantially restrict rotation of the wheel about its wheel axis of rotation. The brake is an indentation formed in the locking bar.

Similarly, US 2006/0032015 provides a simple, inexpensive wheel lock suitable for use with many single or multiple wheel casters. Generally speaking, a known conventional caster has an integrally formed frame including a caster holder that has a curved fender and one or two wheels positioned below the curved fender. A wheel lock according to an embodiment of the invention is a curved piece of semi-rigid material that fits tightly enough into the space between the fender and the wheel to prevent the wheel from rolling. The wheel lock can be made to have an optional tab on the outer edge that permits easy positioning of the wheel lock and facilitates its removal.

Other caster locks have consisted of mechanisms in which a caster wheel is disposed to arrest the rotation of the caster wheel. For example, U.S. Pat. No. 5,210,903 provides that the roller of a caster mounting an article of furniture is lodged in an upwardly opening diametral groove in a flat circular caster stop having a central aperture in such slot and opposed ramps in the slot sloping oppositely upward with a gentle incline onto which a caster roller can roll from such central aperture.

Similarly, U.S. Pat. No. 5,513,727 provides a circumferential chock including opposing jaw members each having a chocking wall for engaging a wheel integrally joined by a hinge for providing movement of the jaw members in relation to each other between an open position for receiving a wheel and a substantially closed position circumferentially engaging the chocking walls with the wheel for braking a wheel against rolling, swiveling, and sliding.

However, none of these conventional devices adequately prevents a caster wheel from inadvertently swiveling or gliding on a floor or other surface when in use and in a locked configuration. Thus, worker injury and/or property damage are still significant issues.

BRIEF SUMMARY OF THE INVENTION

In various exemplary embodiments, the present invention provides a two-piece chock assembly for securing a caster wheel or the like. The two pieces of the chock assembly are disposed under either end or side of the caster wheel and collectively surround the lower portion of the caster wheel. The lower portion of the caster wheel sits in a conformal recess collectively defined by the two pieces of the chock assembly. The two pieces are subsequently drawn together by a suitable clamping mechanism, such as a pair of cam locks, thereby securing the two pieces together and to the caster wheel by driving the two pieces into and partially beneath the caster wheel. This provides a clamping force on the caster wheel and generates a force from the chock assembly up into the caster wheel and a corresponding force from the caster wheel down into the chock assembly and through the chock assembly into the floor or other surface, thereby preventing swiveling or gliding of the caster wheel relative to the floor or other surface when the chock assembly is in a locked configuration. The conformal recess in which the caster wheel sits includes a pair of opposed ramp structures that the caster wheel engages and that act as a detent for the caster wheel. Optionally, these opposed ramp structures form a void that allows a center section of the lower portion of the caster wheel to touch the floor or other surface. Further, the bottom surface of each of the two pieces of the chock assembly optionally includes a friction surface disposed thereon that prevents the chock assembly from swiveling or gliding on the floor or other surface when the two pieces of the chock assembly are drawn under the lower portion of the caster wheel.

In one exemplary embodiment, the present invention provides a stabilizing chock assembly for a caster wheel or the like, including: a first stabilizing member or piece and a second stabilizing member or piece; and a clamping mechanism coupling the first stabilizing member to the second stabilizing member, the clamping mechanism operable for selectively biasing the first stabilizing member and the second stabilizing member together about a wheel; wherein the first stabilizing member and the second stabilizing member collectively define a conformal recess that is configured to selectively receive and retain a lower portion of the wheel. Optionally, the first stabilizing member and the second stabilizing member each comprise a half-disc-shaped structure. Optionally, the clamping mechanism includes one or more cam locks. Optionally, the first stabilizing member and the second stabilizing member each define an arcuate ramp structure that forms a portion of the conformal recess. Optionally, each of the ramp structures includes a friction surface disposed thereon. Preferably, the chock assembly also includes a friction surface disposed on a bottom surface of each of the first stabilizing member and the second stabilizing member. In use, when the first stabilizing member and the second stabilizing member are biased together about the wheel, and the lower portion of the wheel is received and retained in the conformal recess collectively defined by the first stabilizing member and the second stabilizing member, the first stabilizing member and the second stabilizing member (and the associated friction surface(s)) are biased downwards into a surface on which the first stabilizing member and the second stabilizing member are disposed.

In another exemplary embodiment, the present invention provides a stabilizing chock method for a caster wheel or the like, including: providing a first stabilizing member or piece and a second stabilizing member or piece; and selectively biasing the first stabilizing member and the second stabilizing member together about a wheel using a clamping mechanism coupling the first stabilizing member to the second stabilizing member; wherein the first stabilizing member and the second stabilizing member collectively define a conformal recess that is configured to selectively receive and retain a lower portion of the wheel. Optionally, the first stabilizing member and the second stabilizing member each comprise a half-disc-shaped structure. Optionally, the clamping mechanism includes one or more cam locks. Optionally, the first stabilizing member and the second stabilizing member each define an arcuate ramp structure that forms a portion of the conformal recess. Optionally, each of the ramp structures comprises a friction surface disposed thereon. Preferably, the method also includes providing a friction surface disposed on a bottom surface of each of the first stabilizing member and the second stabilizing member. In use, when the first stabilizing member and the second stabilizing member are biased together about the wheel, and the lower portion of the wheel is received and retained in the conformal recess collectively defined by the first stabilizing member and the second stabilizing member, the first stabilizing member and the second stabilizing member (and the associated friction surface(s)) are biased downwards into a surface on which the first stabilizing member and the second stabilizing member are disposed.

BRIEF DESCRIPTION OF THE DRAWINGS

The present invention is illustrated and described herein with reference to the various drawings, in which like reference numbers are used to denote like assembly components/method steps, as appropriate, and in which.

DETAILED DESCRIPTION OF THE INVENTION

Figure 1:
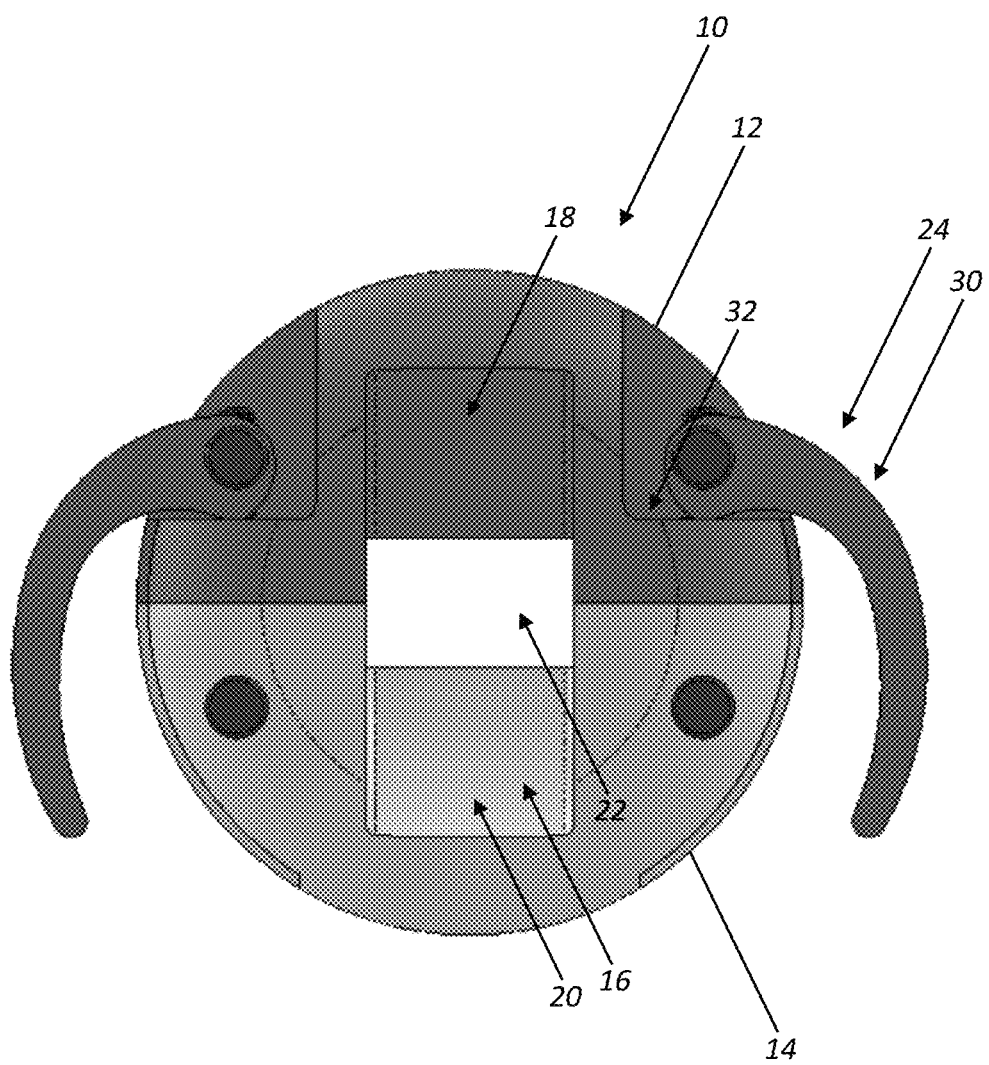
FIG. 1 is a top planar view of one exemplary embodiment of the chock assembly of the present invention.
Figure 2:
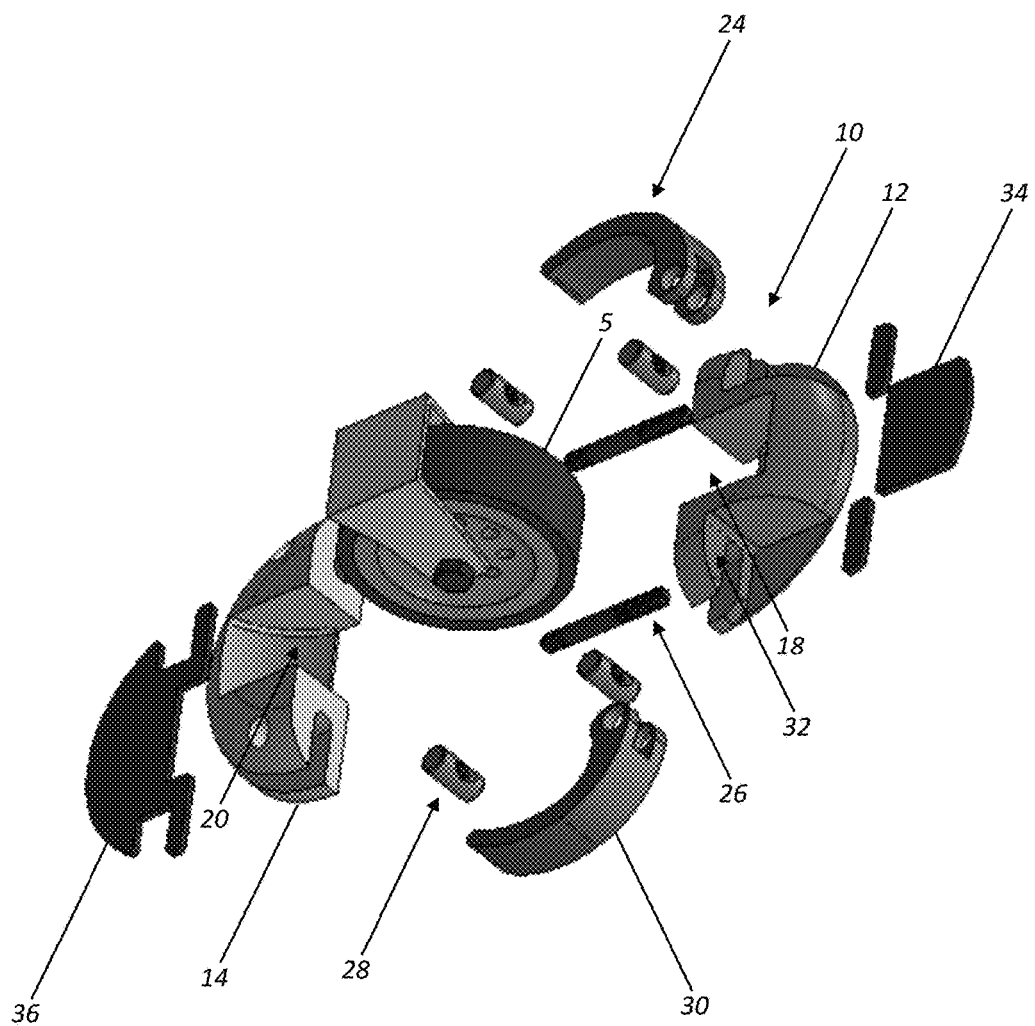
FIG. 2 is an exploded perspective view of one exemplary embodiment of the chock assembly of the present invention, engaging a caster wheel.

Referring now specifically to FIGS. 1-4, in one exemplary embodiment, the present invention provides a two-piece chock assembly 10 for securing a caster wheel 5 (FIGS. 2-4) or the like. The two pieces 12 and 14 of the chock assembly 10 are disposed under either end or side of the caster wheel 5 and collectively surround the lower portion of the caster wheel 5. In this exemplary embodiment, each of the two pieces 12 and 14 of the chock assembly 10 is a half-circle structure and collectively the chock assembly 10 is a puck-like structure having rounded or smoothed edges. It will be readily apparent to those of ordinary skill in the art that other suitable configurations and/or shapes could be used equally. Preferably, the chock-assembly 10 is manufactured from a substantially rigid material, such as a metal material, a plastic material, and/or a rubber material.

The lower portion of the caster wheel 5 sits in a conformal recess 16 (FIGS. 1, 3, and 4) collectively defined by the two pieces 12 and 14 of the chock assembly 10. In general, this conformal recess 16 and the lower portion of the caster wheel 5 can be aligned either substantially perpendicular or substantially parallel to the straight inside edge of each of the two pieces 12 and 14 of the chock assembly 10. Thus, the conformal recess 16 and the lower portion of the caster wheel 5 can be aligned along any lateral or longitudinal diameter of the puck-like structure. Optionally, the conformal recess 16 in which the caster wheel 5 sits includes a pair of opposed arcuate ramp structures 18 and 20 (FIGS. 1 and 2) that the caster wheel 5 engages and that act as a detent for the caster wheel 5. Optionally, these opposed arcuate ramp structures 18 and 20 form a void 22 (FIG. 1) that allows a center section of the lower portion of the caster wheel 5 to touch the floor or other surface. Optionally, the surface of each of the opposed arcuate ramp structures 18 and 20 includes a friction surface (not illustrated) disposed thereon that prevents the caster wheel 5 from slipping with respect to the two pieces 12 and 14 of the chock assembly 10 when they are engaged. It will be readily apparent to those of ordinary skill in the art that any other suitable capture mechanism can also be used to securely retain the caster wheel 5 within the interior portion of the two pieces 12 and 14 of the chock assembly 10.

The two pieces 12 and 14 are subsequently drawn together by a suitable clamping mechanism, such as a pair of cam locks 24 in this exemplary embodiment, thereby securing the two pieces 12 and 14 together and to the caster wheel 5 by driving the two pieces 12 and 14 into and partially beneath the caster wheel. This provides a clamping force on the caster wheel 5 and generates a force from the chock assembly 10 up into the caster wheel 5 and a corresponding force from the caster wheel 5 down into the chock assembly 10 and through the chock assembly 10 into the floor or other surface, thereby preventing swiveling or gliding of the caster wheel 5 relative to the floor or other surface when the chock assembly 10 is in a locked configuration. In this exemplary embodiment, parallel cam locks 24 are provided on either side of the caster wheel 5, such that the two pieces 12 and 14 are together evenly and squarely about the caster wheel 5.

In this exemplary embodiment, each of the pair of cam locks 24 includes a partially or wholly threaded rod 26 (FIG. 2) that engages a cylindrical cam nut 28 (FIG. 2) on each end, each cylindrical cam nut 28 rotatably coupled to one of the two pieces 12 and 14 of the chock assembly 10. In a conventional manner, for each of the pair of cam locks 24, one cylindrical cam nut 28 is disposed in a conformal cylindrical port manufactured into one of the two pieces 14 of the chock assembly 10 and rotatably receives one threaded end of the threaded rod 26. The opposed cylindrical cam nut 28 is disposed in a conformal cylindrical port manufactured into a cam lever 30 associated with the other of the two pieces 12 of the chock assembly 10 and rotatably receives the opposed threaded end of the threaded rod 26. The threaded rod 26 is rotated by rotation of the cam lever 30 to draw the two pieces 12 and 14 of the chock assembly 10 into alignment and together and the cam lever 30 is ultimately pivoted against a cam shoulder 32 (FIGS. 1 and 2) of the associated piece 12 of the chock assembly 10 to firmly secure the two pieces 12 and 14 of the chock assembly 10 about the caster wheel 5 by translating the threaded rod 26.

Further, the bottom surface of each of the two pieces 12 and 14 of the chock assembly 10 includes a substantially conformal friction surface 34 and 36 (FIG. 2) disposed thereon that prevents the chock assembly 10 from swiveling or gliding on the floor or other surface when the two pieces 12 and 14 of the chock assembly 10 are drawn under the lower portion of the caster wheel 5. Preferably, the substantially conformal friction surfaces 34 and 36 are manufactured from a substantially flexible material, such as a plastic material and/or a rubber material, and are adhered to the bottom surfaces or the like. It is contemplated that the substantially conformal friction surfaces 34 and 36 can be replaced when worn or damaged through usage or otherwise.

Figure 3:
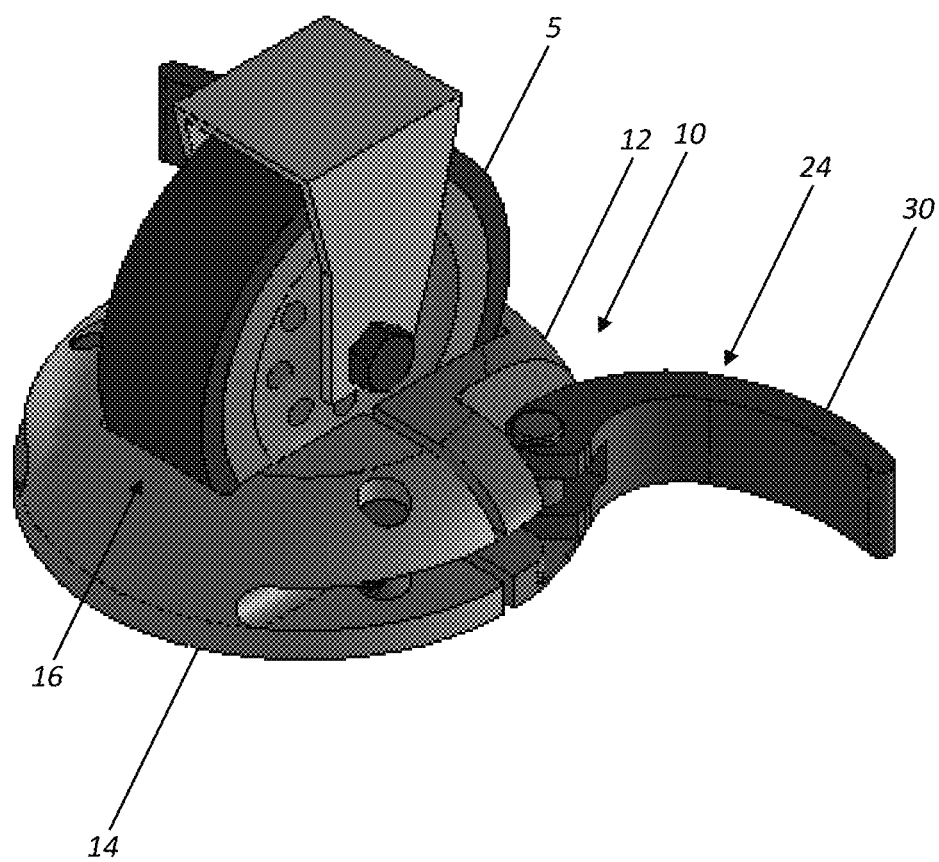
FIG. 3 is a perspective view of one exemplary embodiment of the chock assembly of the present invention, engaging a caster wheel in an unlocked configuration.
Figure 4:
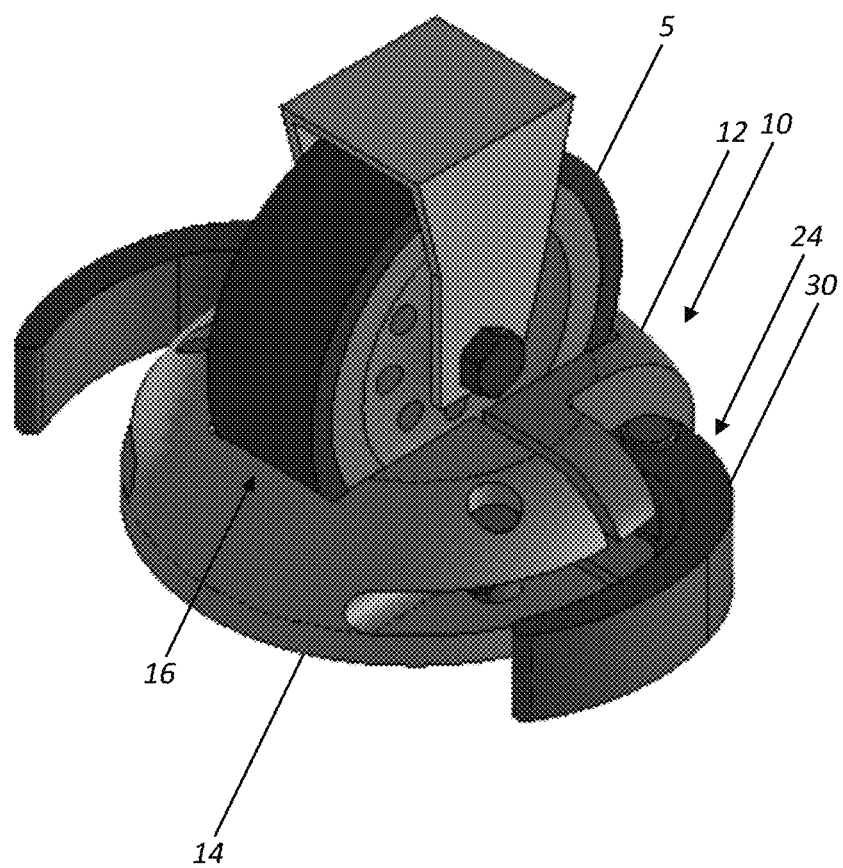
FIG. 4 is a perspective view of one exemplary embodiment of the chock assembly of the present invention, engaging a caster wheel in a locked configuration.

Of note, FIG. 3 is a perspective view of one exemplary embodiment of the chock assembly 10 of the present invention engaging a caster wheel in an unlocked configuration. FIG. 4 is a perspective view of this same exemplary embodiment of the chock assembly 10 of the present invention engaging a caster wheel in a locked configuration.

In use, the caster wheel 5 may be placed adjacent to one of the two pieces 12 of the chock assembly 10, then the other of the two pieces 14 of the chock assembly 10 coupled to the first piece 12, and finally the two pieces 12 and 14 tightened together about the caster wheel 5 using the cam locks 24. Alternatively, the caster wheel 5 may be rolled onto/into the two pieces 12 and 14 of the chock assembly 10 already assembled, the two pieces 12 and 14 then tightened together about the caster wheel 5 using the cam locks 24.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims.

What is claimed is:

1. A stabilizing chock assembly for a caster wheel, comprising:

a first stabilizing member and a second stabilizing member; and a clamping mechanism coupling the first stabilizing member to the second stabilizing member, the clamping mechanism operable for selectively biasing the first stabilizing member and the second stabilizing member together about a wheel;

wherein the first stabilizing member and the second stabilizing member collectively define a conformal recess that is configured to selectively receive and retain a lower portion of the wheel;

wherein, when the first stabilizing member and the second stabilizing member are biased together about the wheel and the lower portion of the wheel is received and retained in the conformal recess collectively defined by the first stabilizing member and the second stabilizing member, the first stabilizing member and the second stabilizing member are biased downwards into contact with a surface on which the first stabilizing member and the second stabilizing member are disposed; and wherein the clamping mechanism comprises one or more cam locks each comprising a cam lever that pivots against a cam shoulder manufactured into a surface of one of the first stabilizing member and the second stabilizing member.

2. The chock assembly of claim 1, wherein the first stabilizing member and the second stabilizing member each comprise a half-disc-shaped structure.

3. The chock assembly of claim 1, wherein the first stabilizing member and the second stabilizing member each define an arcuate ramp structure that forms a portion of the conformal recess.

4. The chock assembly of claim 3, wherein each of the ramp structures comprises a friction surface disposed thereon.

5. The chock assembly of claim 3, wherein each of the ramp structures forms a void.

6. The chock assembly of claim 1, further comprising a friction surface disposed on a bottom surface of each of the first stabilizing member and the second stabilizing member.

7. The chock assembly of claim 1, wherein the clamping mechanism comprises a pair of cam locks.

8. The chock assembly of claim 7, wherein the clamping mechanism comprises a pair of parallel cam locks, with one cam lock disposed on each side of the wheel.

9. A stabilizing chock method for a caster wheel, comprising:

providing a first stabilizing member and a second stabilizing member; and selectively biasing the first stabilizing member and the second stabilizing member together about a wheel using a clamping mechanism coupling the first stabilizing member to the second stabilizing member;

wherein the first stabilizing member and the second stabilizing member collectively define a conformal recess that is configured to selectively receive and retain a lower portion of the wheel;

wherein, when the first stabilizing member and the second stabilizing member are biased together about the wheel and the lower portion of the wheel is received and retained in the conformal recess collectively defined by the first stabilizing member and the second stabilizing member, the first stabilizing member and the second stabilizing member are biased downwards into contact with a surface on which the first stabilizing member and the second stabilizing member are disposed; and wherein the clamping mechanism comprises one or more cam locks each comprising a cam lever that pivots against a cam shoulder manufactured into a surface of one of the first stabilizing member and the second stabilizing member.

10. The chock method of claim 9, wherein the first stabilizing member and the second stabilizing member each comprise a half-disc-shaped structure.

11. The chock method of claim 9, wherein the first stabilizing member and the second stabilizing member each define an arcuate ramp structure that forms a portion of the conformal recess.

12. The chock method of claim 11, wherein each of the ramp structures comprises a friction surface disposed thereon.

13. The chock method of claim 11, wherein each of the ramp structures forms a void.

14. The chock method of claim 9, further comprising providing a friction surface disposed on a bottom surface of each of the first stabilizing member and the second stabilizing member.

15. The chock method of claim 9, wherein the clamping mechanism comprises a pair of cam locks.

16. The chock method of claim 15, wherein the clamping mechanism comprises a pair of parallel cam locks, with one cam lock disposed on each side of the wheel.

17. A stabilizing chock assembly for a caster wheel, comprising:
　　a first stabilizing member and a second stabilizing member; and
　　a clamping mechanism coupling the first stabilizing member to the second stabilizing member, the clamping mechanism operable for selectively biasing the first stabilizing member and the second stabilizing member together about a wheel;
　　wherein the first stabilizing member and the second stabilizing member collectively define a conformal recess that is configured to selectively receive and retain a lower portion of the wheel; and
　　wherein the clamping mechanism comprises one or more cam locks each comprising a cam lever that pivots against a cam shoulder manufactured into a surface of one of the first stabilizing member and the second stabilizing member.

18. The chock assembly of claim 17, wherein the clamping mechanism comprises a pair of cam locks.

19. The chock assembly of claim 18, wherein the clamping mechanism comprises a pair of parallel cam locks, with one cam lock disposed on each side of the wheel.

\* \* \* \* \*